United States Patent
Hogan (10) Patent No.: US 9,215,100 B2
(45) Date of Patent: Dec. 15, 2015

(54) ISOLATED DATA ACQUISITION

(71) Applicant: Siemens Industry, Inc., Alpharetta, GA (US)

(72) Inventor: Brian Hogan, Temecula, CA (US)

(73) Assignee: Siemens Industry, Inc., Alpharetta, GA (US)

( * ) Notice: Subject to any disclaimer, the term of this patent is extended or adjusted under 35 U.S.C. 154(b) by 247 days.

(21) Appl. No.: 13/769,080

(22) Filed: Feb. 15, 2013

(65) Prior Publication Data

US 2014/0232369 A1    Aug. 21, 2014

(51) Int. Cl.
*H02M 3/337*    (2006.01)
*G01R 19/00*    (2006.01)
*H03K 17/06*    (2006.01)
*H04L 25/02*    (2006.01)

(52) U.S. Cl.
CPC ......... *H04L 25/0268* (2013.01); *H04L 25/0292* (2013.01)

(58) Field of Classification Search
CPC ................................. H01F 30/00; H01F 38/00
USPC ...................... 324/76.11; 327/427; 363/24–26
See application file for complete search history.

(56) References Cited

U.S. PATENT DOCUMENTS

| 6,370,039 B1* | 4/2002 | Telefus ........................... 363/15 |
| 6,407,691 B1* | 6/2002 | Yu .................................. 341/155 |
| 2004/0232971 A1* | 11/2004 | Kawasaki et al. .............. 327/427 |
| 2009/0212759 A1* | 8/2009 | Melanson .................. 324/76.11 |
| 2010/0023283 A1* | 1/2010 | Boutorabi et al. .............. 702/60 |

OTHER PUBLICATIONS

PCT International Search Report mailed Jun. 26, 2014 corresponding to PCT International Application No. PCT/US2014/016526 filed Feb. 14, 2014 (13 pages).

* cited by examiner

*Primary Examiner* — Timothy J Dole
*Assistant Examiner* — Sisay G Tiku (57) ABSTRACT

A data acquisition circuit may isolate control and data decode logic elements from data acquisition elements such as sensors through the use of a single transformer. A control signal may be supplied to a primary winding of a transformer by alternately opening and closing a push switch and a pull switch. First and second analog to digital converter circuits may receive analog signals and convert them to data signals, which may appear on the secondary winding of the transformer. Data signals may be substantially received by a data demodulator circuit on the primary side of the data acquisition circuit. The data demodulator circuit may compare a voltage associated with the received signal to a threshold voltage and output a result of the comparison to the control and data decode logic element.

33 Claims, 3 Drawing Sheets

ISOLATED DATA ACQUISITION

BACKGROUND

Data acquisition systems and methods may employ circuits including isolation between data sensors and processing components. Isolation may prevent damage to the processing components in cases wherein hazardous and/or unexpected signals are detected by a sensor. Isolation may also improve a circuit's sensitivity by improving noise immunity, removing ground loops, and/or improving common-mode rejection, for example.

DETAILED DESCRIPTION OF SEVERAL EMBODIMENTS

Isolated data acquisition circuits may use a single transformer to provide isolation between sensors and other circuit components. Data may be exchanged between isolated sections of a data acquisition circuit in two directions through the single transformer. This may be accomplished through the use of transformer switching modulation on one isolated side of the circuit and current modulation on the other isolated side of the circuit. An isolated data acquisition circuit with a single transformer may be inexpensive and compact.

Figure 1:
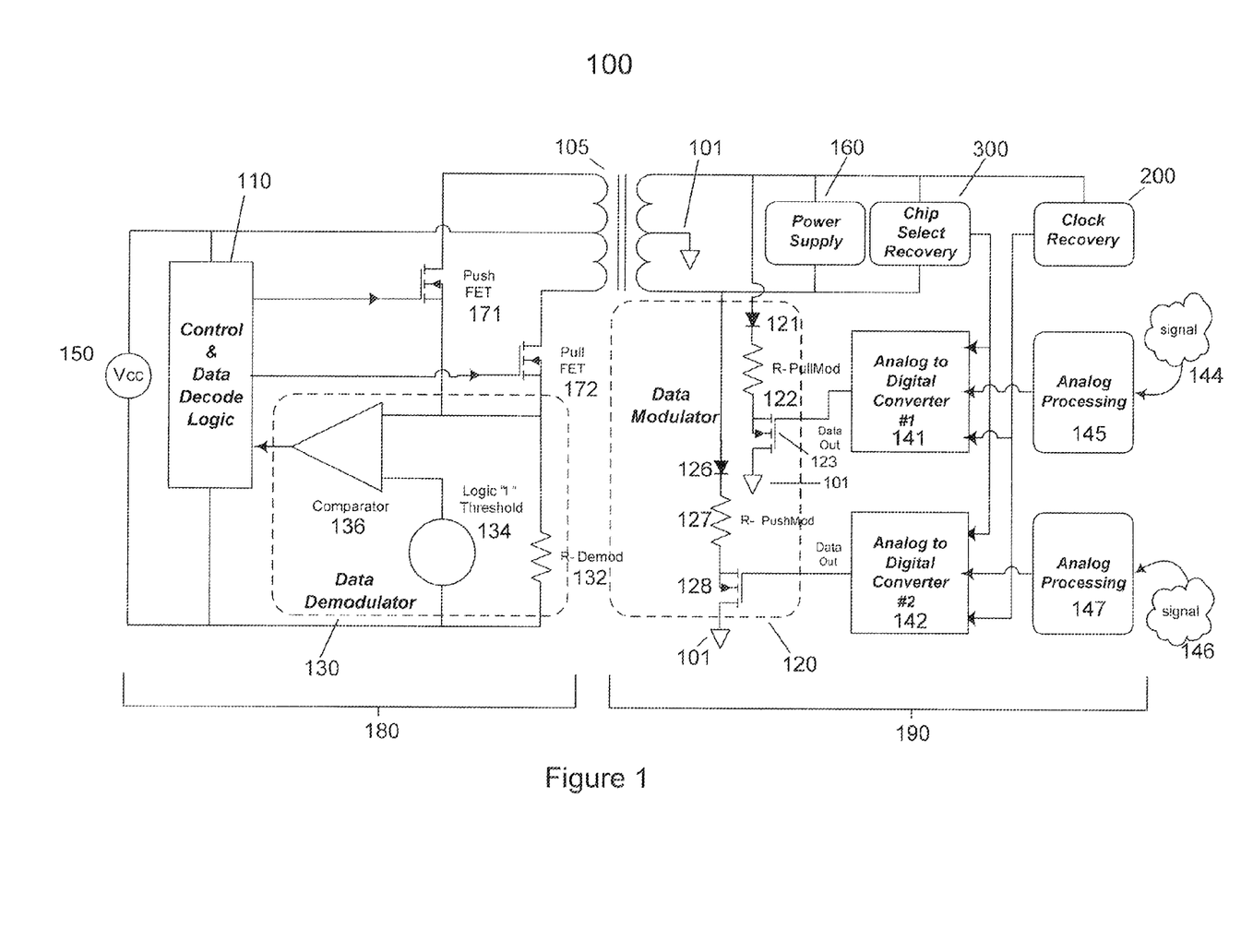
FIG. 1 is a data acquisition circuit according to an embodiment of the invention.

FIG. 1 is a data acquisition circuit 100 according to an embodiment of the invention. A transformer 105 may isolate a primary side 180 of the circuit 100 from a secondary side 190 of the circuit 100. As will be described in greater detail below, the transformer 105 may send clock data and/or chip select data from the primary side 180 to the secondary side 190. The transformer 105 may also send data, such as sensed data, from the secondary side 190 to the primary side 180.

The primary side 180 in this exemplary circuit 100 may include control and data decode logic 110. Control and data decode logic 110 may include one or more programmable logic devices (for example field programmable gate array (FPGA) or complex programmable logic device (CPLD) elements), central processing units (CPUs), or other suitable devices. The primary side 180 may also include data demodulator circuitry 130. In this example, the data demodulator 130 includes a demodulator resistor 132, a threshold voltage 134, and a comparator 136. The primary side 180 may also include a push transistor 171 and a pull transistor 172. In this example, the push transistor 171 and pull transistor 172 are field effect transistors (FETs), although other transistor types could be used. The functions of these elements will be described in greater detail below in the context of the entire circuit 100. Those of ordinary skill in the art will appreciate that other circuit elements may be present in a primary side 180 of a data acquisition circuit 100.

The secondary side 190 in this example circuit 100 may include analog processing circuitry 145, 147 which may receive analog signals 144, 146. In this example, two signals 144, 146 are being monitored, and two sets of analog processing circuitry 145, 147 are provided, though more or fewer sets may be included in other embodiments. Each set of analog processing circuitry 145, 147 may be in communication with an analog to digital converter (ADC) 141, 142. The secondary side 190 may also include data modulator circuitry 120. The data modulator 120 may include a pull modulator diode 121, pull modulator resistor 122, and pull modulator transistor 123. The data modulator 120 may also include a push modulator diode 126, push modulator resistor 127, and push modulator transistor 128. The secondary side 190 may also include a power supply 160, clock recovery circuit 200, and/or chip select recovery circuit 300. The functions of these elements will be described in greater detail below in the context of the entire circuit 100. Those of ordinary skill in the art will appreciate that other circuit elements may be present in a secondary side 190 of a data acquisition circuit 100.

The control and data decode logic 110 may provide a push/pull sequence and data decode logic for the circuit 100. The push/pull sequence may provide an alternating magnetic field that may couple the primary winding of the transformer 105 with the secondary winding for the purposes of transferring clock and chip select data to the secondary side and receiving sensor data from the secondary side. The control and data decode logic 110 may provide a magnetic field in one direction in the transformer 105 when the push FET 171 is closed (a push action) and a magnetic field in the opposite direction in the transformer 105 when the pull FET 172 is closed (a pull action). The power supply block 160 of the secondary side 190 may supply a signal, such as a 5 volt DC signal, for use by secondary side 190 electronic loads such as the clock recovery circuit 200, the chip select recovery circuit 300, and/or the data modulator 120. The secondary side 190 loads may be virtually static (or constant) with the exception of those loads inside the data modulator block 120.

As noted above, the data modulator 120 may include two resistive loads 122, 127. The loads 122, 127 may be turned off and on by FETs 123, 128 or other switches 123, 128. The FETs 123, 128 may be controlled by data output by the two ADCs 141, 142 of the secondary side 190. For example, when ADC 141 outputs a signal indicating detection of an analog signal 144 by the analog processing circuitry 145, FET 123 may close. When ADC 142 outputs a signal indicating detection of an analog signal 146 by the analog processing circuitry 147, FET 128 may close. Each resistive load 122, 127 may be in series with a diode 121, 126 such that a push diode 126 may load the push FET 171 on the primary side 180 and a pull diode 121 may load the pull FET 172 on the primary side 180. These loads may produce variations in voltage across the resistor R-demod 132. When the push FET 171 is closed, the push diode 126 load may be sensed by R-demod 132, and when the pull FET 172 is closed, the pull diode 121 load may be sensed by R-demod 132. Thus, signals 144 and 146 may be detected on the primary side 180 alternately as the control and data decode logic 110 alternately switches the push FET 171 and pull FET 172 on and off. The voltage across the resistor R-demod 132 may be compared against a threshold voltage 134 by the comparator 136 in the data demodulator block 130. The threshold voltage 134 may be set between a static load of the secondary side 190 and the combined static load of the secondary side 190 plus R-Mod. R-Mod may be either R-PushMod 127 or R-PullMod 122 in this example, depending on which ADCs 141, 142 data output has turned on its associated FET switch 123, 128. In some embodiments, R-PushMod 127 and R-PullMod 122 may have substantially identical values so that the threshold voltage 134 may remain constant. Hence the comparator 136 output may indicate the output data (i.e. high/low) of the ADCs 141, 142. One ADC 141 may be associated with a pull action, and the other ADC 142 may be associated with a push action. Since the control and data decode logic block 110 may provide control of the push/pull action and may monitor the comparator 136, output recovery (or decode) of each ADCs 141, 142 data may be processed from the alternating serial stream output by the comparator 136. The control and data decode logic block 110 may know which of the push FET 171 and pull FET 172 is closed at any time, and may use that information to determine from which of the ADCs 141, 142 the data is being received. Processing performed by the control and data decode logic block 110 may include a serial-to-parallel conversion with two results, one for each ADC 141, 142. The results may be stored in separate registers within the control and data decode logic block 110. The number of bits for each of the two values may be determined by the resolution of the ADCs 141, 142. For example, ADCs from 8 to 16 bits may be commonly available and may be used by many sensors, however resolutions greater than 16 bits may be supported by minor changes in the control and data decode logic block 110.

Figure 2:
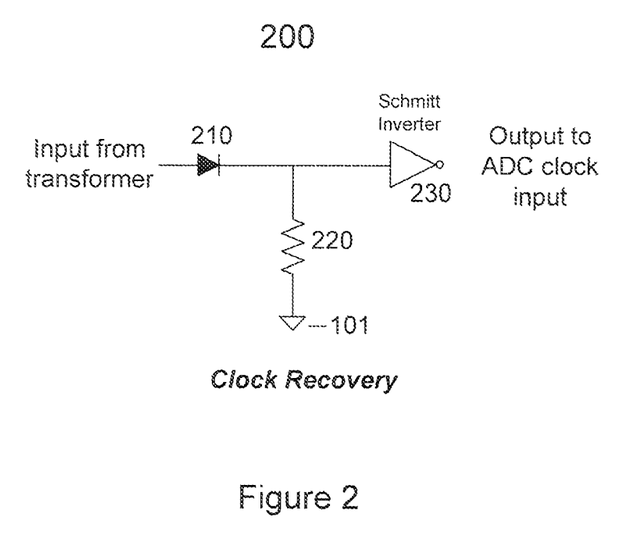
FIG. 2 is a clock recovery circuit according to an embodiment of the invention.

The ADCs 141, 142 may use an external clock signal. The clock signal may be provided by processing the secondary side 190 winding signal from the transformer 105 into a square wave which may provide an ADC clock input. FIG. 2 is a clock recovery circuit 200 according to an embodiment of the invention. The control and data decode logic 110 may switch the push FET 171 and pull FET 172 so that only one of the FETs 171, 172 is closed at any time, and the FETs 171, 172 may be alternately closed for substantially equal time periods. The switching may be controlled by the control and data decode logic 110 to correspond to a clock rate required by the ADCs 141, 142. The clock recovery block 200 may provide clock input signal conditioning by rectifying the secondary winding signal with a diode 210 and resistor 220. The diode 210 may be connected to one node of the secondary side of the winding 105. Thus, a signal may flow through the diode 210 when only one of either the push FET 171 and pull FET 172 is closed. Then the clock recovery block 200 may use a Schmitt inverter 230 to invert and/or voltage condition the waveform to logic levels which may be useable by the ADCs 141, 142. The Schmitt inverter 230 may voltage condition a signal by receiving a variable input signal centered around a particular voltage and outputting a clean and constant signal of a lower voltage. For example, a square wave signal with a peak centered around 7 volts that is varying between 6.8 and 7.2 volts may be produced by the diode 210 and resistor 220 portion of the clock recovery circuit 200. The Schmitt inverter 230 may output a square wave signal with a substantially constant 5 volt peak for use as a clock signal by the ADCs 141, 142. Those of ordinary skill in the art will appreciate that in some embodiments the clock signal may not be inverted, so a Schmitt inverter 350 may not may be used in the clock recovery circuit 200.

Figure 3:
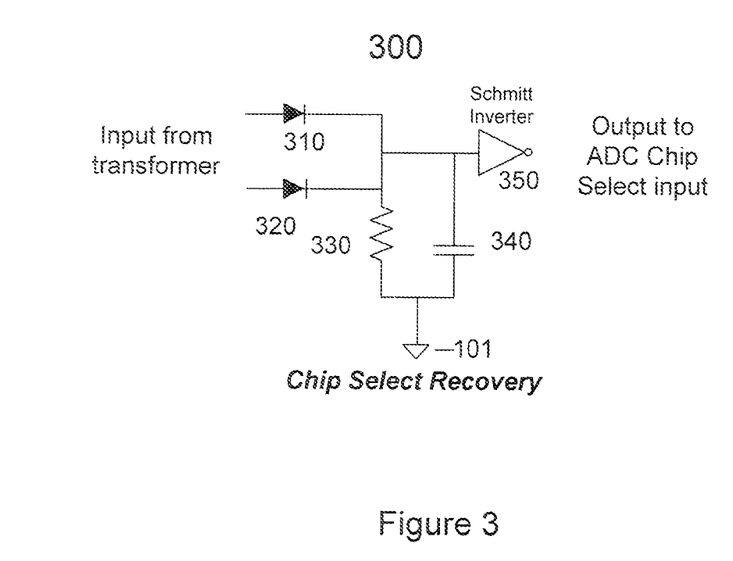
FIG. 3 is a chip select recovery circuit according to an embodiment of the invention.

The ADCs 141, 142 may also use a chip select signal to initiate a conversion (i.e. convert a voltage measured on input to a binary number which may be output as a serial data stream). FIG. 3 is a chip select recovery circuit 300 according to an embodiment of the invention. The chip select recovery block 300 may detect the chip select signal by receiving inputs from each node of the secondary winding of the transformer 105 through diodes 310, 320. The control and data decode logic 110 may switch the push FET 171 and pull FET 172 so that only one of the FETs 171, 172 is closed at any time, and the FETs 171, 172 may be alternately closed for substantially equal time periods. Closing one of the FETs 171, 172 may produce a voltage at one of the nodes of the secondary winding of the transformer 105, and closing the other one of the FETs 171, 172 may produce a voltage at the other one of the nodes of the secondary winding of the transformer 105. One of the diodes 310, 320 is connected to one of the nodes of the secondary winding of the transformer 105, and the other one of the diodes 310, 320 is connected to the other one of the nodes of the secondary winding of the transformer 105. Therefore, a signal from the transformer 105 may be substantially constantly detected by the diodes 310, 320, excepting for a brief delay period associated with the switching off of one of the FETs 171, 172 and switching on of the other of the FETs 171, 172 by the control and data decode logic 110. These signals may be merged and filtered with a parallel resistor 330 and capacitor 340 to ground 101 and applied to a Schmitt inverter 350 to voltage condition the waveform to logic levels which may be useable by the ADCs 141, 142. The capacitor 340 may stabilize the signal input to the Schmitt inverter 350 during delay periods associated with the switching of the FETs 171, 172. When switching of the push-pull FETs 171, 172 is occurring, the signal input to the Schmitt inverter 350 may be high, and the output of the Schmitt inverter 350 may be a logic low. However, when the push-pull FETs 171, 172 are not being switched, the capacitor 340 may be drained of its energy by the resistor 330, and the output of the Schmitt inverter 350 may be logic high. The ADC chip select input may be edge triggered on the transition from high to low. Therefore, when switching starts, a conversion may be initiated. As noted above, when ADC 141 outputs a signal indicating detection of an analog signal 144 by the analog processing circuitry 145, FET 123 may close. When ADC 142 outputs a signal indicating detection of an analog signal 146 by the analog processing, circuitry 147, FET 128 may close. However, the ADCs 141, 142 may not need to detect signals and close the FETs 123, 128 if the control and data decode logic 110 is not operating the push/pull FETs 171, 172 and monitoring the data demodulator 130. Therefore, when switching of the FETs 171, 172 is not taking place, the transition to logic high output of the chip select recovery circuit 300 may cause the ADCs 141, 142 to be inactive. Those of ordinary skill in the art will appreciate that in some embodiments. ADCs 141, 142 may be triggered on by a transition to logic low and of by a transition to logic high, and therefore a Schmitt inverter 350 may not be used in the chip select recovery circuit 300.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above-described embodiments In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", an "the", "said", etc. also signify "at least one" or "the at least one" in the specification, claims and drawings.

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112, paragraph 6.

What is claimed is:

1. A data acquisition circuit comprising:
a transformer comprising a primary winding in communication with a primary side of the data acquisition circuit and a secondary winding in communication with a secondary side of the data acquisition circuit;
a push switch on the primary side of the data acquisition circuit;
a pull switch on the primary side of the data acquisition circuit;
a control and data decode logic element connected on the primary side of the data acquisition circuit and constructed and arranged to
supply a control signal to the primary winding of the transformer by alternately opening and closing the push switch and the pull switch; and
receive data;
a first analog to digital converter circuit connected on the secondary side of the data acquisition circuit and constructed and arranged to receive a first analog signal and output a first data signal indicating that the first analog signal has been received to the secondary winding of the transformer;
a second analog to digital converter circuit connected on the secondary side of the data acquisition circuit and constructed and arranged to receive a second analog signal and output a second data signal indicating that the second analog signal has been received to the secondary winding of the transformer; and
a data demodulator circuit connected on the primary side of the data acquisition circuit and constructed and arranged to:
receive a pull modulation signal from the primary winding of the transformer when the pull switch is closed and when the control signal is being supplied to the primary winding of the transformer, the pull modulation signal substantially comprising the first data signal;
receive a push modulation signal from the primary winding of the transformer when the push switch is closed and when the control signal is being supplied to the primary winding of the transformer, the push modulation signal substantially comprising the second data signal;
detect a voltage dependent on a current of the pull modulation signal;
detect a voltage dependent on a current of the push modulation signal;
compare the voltage dependent on the current of the push modulation signal to a threshold voltage and output a result of the push modulation comparison to the control and data decode logic element; and
compare the voltage dependent on the current of the pull modulation signal to the threshold voltage and output a result of the pull modulation comparison to the control and data decode logic element;
wherein the control and data decode logic element is further configured to:
identify a binary logic state of the first analog to digital converter circuit output from the result of the pull modulation comparison; and
identify a binary logic state of the second analog to digital converter circuit output from the result of the push modulation comparison.

2. The data acquisition circuit of claim 1, further comprising a power supply on the secondary side of the data acquisition circuit constructed and arranged to send a direct current power signal to the first analog to digital converter circuit and the second analog to digital converter circuit.

3. The data acquisition circuit of claim 1, further comprising a voltage source on the primary side of the data acquisition circuit constructed and arranged to supply an alternating current signal to the primary winding of the transformer.

4. The data acquisition circuit of claim 1, wherein the push switch comprises a field effect transistor (FET) and the pull switch comprises a FET.

5. The data acquisition circuit of claim 1, wherein:
the first analog to digital converter circuit comprises
a first analog to digital converter on the secondary side of the data acquisition circuit constructed and arranged to receive the first analog signal and output a first digital signal indicating that the first analog signal has been received; and
a first data modulator circuit on the secondary side of the data acquisition circuit constructed and arranged to receive the first digital signal from the first analog to digital converter and close a pull modulator switch in response to output the first data signal to the secondary winding of the transformer; and
the second analog to digital converter circuit comprises
a second analog to digital converter on the secondary side of the data acquisition circuit constructed and arranged to receive the second analog signal and output a second digital signal indicating that the second analog signal has been received; and
a second data modulator circuit on the secondary side of the data acquisition circuit constructed and arranged to receive the second digital signal from the second analog to digital converter and close a push modulator switch in response to output the second data signal to the secondary winding of the transformer.

6. The data acquisition circuit of claim 5, wherein:
the first data modulator circuit comprises
a pull modulator diode in communication with the secondary winding of the transformer;
a pull modulator resistor in communication with the pull modulator diode;
the pull modulator switch, wherein the pull modulator switch is in communication with the pull modulator resistor and the first analog to digital converter; and
the second data modulator circuit comprises
a push modulator diode in communication with the secondary winding of the transformer;
a push modulator resistor in communication with the push modulator diode; and
the push modulator switch, wherein the push modulator switch is in communication with the push modulator resistor and the second analog to digital converter.

7. The data acquisition circuit of claim 1, further comprising a chip select recovery circuit on the secondary side of the data acquisition circuit constructed and arranged to:
receive a data decode signal from the secondary winding of the transformer, the data decode signal substantially comprising the control signal;
extract a chip select signal from the data decode signal; and
send the chip select signal to the first analog to digital converter and the second analog to digital converter;
wherein the first analog to digital converter and the second analog to digital converter are constructed and arranged to be triggered to perform analog to digital conversion based on data in the chip select signal.

8. The data acquisition circuit of claim 7, wherein the chip select recovery circuit comprises:

a first diode comprising an input connected to a first node of the secondary winding of the transformer and an output;
a second diode comprising an input connected to a second node of the secondary winding of the transformer and an output;
a capacitor connected to the output of the first diode and the output of the second diode;
a load connected to the output of the first diode and the output of the second diode; and
an inverter circuit connected to the output of the first diode, the output of the second diode, and the capacitor, the inverter circuit being constructed and arranged to generate the chip select signal based on a combined signal received from the output of the first diode, the output of the second diode, and the capacitor.

9. The data acquisition circuit of claim 1, further comprising a clock recovery circuit on the secondary side of the data acquisition circuit constructed and arranged to:
receive a data decode signal from the secondary winding of the transformer, the data decode signal substantially comprising at least a portion of the control signal;
extract a clock signal from the data decode signal; and
send the clock signal to the first analog to digital converter and the second analog to digital converter.

10. The data acquisition circuit of claim 9, wherein the clock recovery circuit comprises:
a diode comprising an input connected to the secondary winding of the transformer and an output;
a load connected to the output of the diode; and
an inverter circuit connected to the output of the diode, the inverter circuit being constructed and arranged to generate the clock signal based on a signal received from the output of the diode.

11. The data acquisition circuit of claim 1, wherein the control and data decode logic element is further constructed and arranged to:
perform serial to parallel data processing on the result of the push modulation comparison to generate processed push data;
store the processed push data in a data register;
perform serial to parallel data processing on the result of the pull modulation comparison to generate processed pull data; and
store the processed pull data in a data register.

12. The data acquisition circuit of claim 1, further comprising:
a first analog processing circuit constructed and arranged to receive an input from a first sensor and generate the first analog signal, wherein the first analog signal comprises data associated with the input from the first sensor; and
a second analog processing circuit constructed and arranged to receive an input from a second sensor and generate the second analog signal, wherein the second analog signal comprises data associated with the input from the second sensor.

13. The data acquisition circuit of claim 1, wherein:
the data demodulator circuit comprises a demodulator resistor;
the voltage dependent on the current of the push modulation signal is a voltage across the demodulator resistor;
the voltage dependent on the current of the pull modulation signal is a voltage across the demodulator resistor; and
the threshold voltage has a value between a voltage across a static load of the secondary side of the data acquisition circuit and a voltage across a static load of the secondary side of the data acquisition circuit plus the pull modulator resistor or the push modulator resistor.

14. A data acquisition method comprising:
supplying, with a control and data decode logic element on a primary side of a data acquisition circuit, a control signal to a primary winding of a transformer by alternately opening and closing a push switch and a pull switch;
receiving, with a first analog to digital converter circuit on a secondary side of the data acquisition circuit, a first analog signal;
outputting, with the first analog to digital converter circuit, a first data signal indicating that the first analog signal has been received to a secondary winding of the transformer;
receiving, with a second analog to digital converter circuit on the secondary side of the data acquisition circuit, a second analog signal;
outputting, with the second analog to digital converter circuit, a second data signal indicating that the second analog signal has been received to the secondary winding of the transformer;
receiving, with a data demodulator circuit on the primary side of the data acquisition circuit, a pull modulation signal from the primary winding of the transformer when the pull switch is closed and when the control signal is being supplied to the primary winding of the transformer, the pull modulation signal substantially comprising the first data signal;
receiving, with the data demodulator circuit, a push modulation signal from the primary winding of the transformer when the push switch is closed and when the control signal is being supplied to the primary winding of the transformer, the push modulation signal substantially comprising the second data signal;
detecting, with the data demodulator circuit, a voltage dependent on a current of the pull modulation signal;
detecting, with the data demodulator circuit, a voltage dependent on a current of the push modulation signal;
comparing, with the data demodulator circuit, the voltage dependent on the current of the push modulation signal to a threshold voltage;
outputting, with the data demodulator circuit, a result of the push modulation comparison to the control and data decode logic element;
comparing, with the data demodulator circuit, the voltage dependent on the current of the pull modulation signal to a threshold voltage;
outputting, with the data demodulator circuit, a result of the pull modulation comparison to the control and data decode logic element
identifying, with the control and data decode logic element, a binary logic state of the first analog to digital converter circuit output from the result of the pull modulation comparison; and
identifying, with the control and data decode logic element, a binary logic state of the second analog to digital converter circuit output from the result of the push modulation comparison.

15. The data acquisition method of claim 14, further comprising sending, with a power supply on the secondary side of the data acquisition circuit, a direct current power signal to the first analog to digital converter circuit and the second analog to digital converter circuit.

16. The data acquisition method of claim 14, further comprising supplying, with a voltage source on the primary side of the data acquisition circuit, an alternating current signal to the primary winding of the transformer.

17. The data acquisition method of claim 14, wherein:
receiving, with the first analog to digital converter circuit, the first analog signal comprises receiving, with a first analog to digital converter on the secondary side of the data acquisition circuit, the first analog signal and outputting, with the first analog to digital converter, a first digital signal indicating that the first analog signal has been received;
outputting, with the first analog to digital converter circuit, the first data signal comprises receiving, with a first data modulator circuit on the secondary side of the data acquisition circuit, the first digital signal from the first analog to digital converter and closing a pull modulator switch in response to output the first data signal to the secondary winding of the transformer;
receiving, with the second analog to digital converter circuit, the first second signal comprises receiving, with a second analog to digital converter on the secondary side of the data acquisition circuit, the second analog signal and outputting, with the second analog to digital converter, a second digital signal indicating that the second analog signal has been received;
outputting, with the second analog to digital converter circuit, the second data signal comprises receiving, with a second data modulator circuit on the secondary side of the data acquisition circuit, the second digital signal from the second analog to digital converter and closing a push modulator switch in response to output the second data signal to the secondary winding of the transformer.

18. The data acquisition method of claim 14, further comprising:
receiving, with a chip select recovery circuit on the secondary side of the data acquisition circuit, a data decode signal from the secondary winding of the transformer, the data decode signal substantially comprising the control signal;
extracting, with the chip select recovery circuit, a chip select signal from the data decode signal; and
sending, with the chip select recovery circuit, the chip select signal to the first analog to digital converter and the second analog to digital converter;
wherein sending the chip select signal to the first analog to digital converter and the second analog to digital converter triggers the first analog to digital converter and the second analog to digital converter to perform analog to digital conversion based on data in the chip select signal.

19. The data acquisition method of claim 14, further comprising:
receiving, with a clock recovery circuit on the secondary side of the data acquisition circuit, a data decode signal from the secondary winding of the transformer, the data decode signal substantially comprising at least a portion of the control signal;
extracting, with the clock recovery circuit, a clock signal from the data decode signal; and
sending, with the clock recovery circuit, the clock signal to the first analog to digital converter and the second analog to digital converter.

20. The data acquisition method of claim 14, further comprising:
performing, with the control and data decode logic element, serial-to parallel data processing on the result of the push modulation comparison to generate processed push data;
storing, with the control and data decode logic element, the processed push data in a data register;
performing, with the control and data decode logic element, serial-to parallel data processing on the result of the pull modulation comparison to generate processed pull data; and
storing, with the control and data decode logic element, the processed pull data in a data register.

21. The data acquisition method of claim 14, further comprising:
receiving, with a first analog processing circuit, an input from a first sensor;
generating, with the first analog processing circuit, the first analog signal, wherein the first analog signal comprises data associated with the input from the first sensor;
receiving, with a second analog processing circuit, an input second a first sensor; and
generating, with the second analog processing circuit, the second analog signal, wherein the second analog signal comprises data associated with the input from the second sensor.

22. A data acquisition circuit comprising:
a transformer comprising a primary winding in communication with a primary side of the data acquisition circuit and a secondary winding in communication with a secondary side of the data acquisition circuit;
a push switch on the primary side of the data acquisition circuit;
a pull switch on the primary side of the data acquisition circuit;
a control and data decode logic element connected on the primary side of the data acquisition circuit constructed and arranged to
supply a control signal to the primary winding of the transformer by alternately opening and closing the push switch and the pull switch; and
receive data;
a first analog to digital converter circuit connected on the secondary side of the data acquisition circuit and arranged to receive a first analog signal and output a first data signal indicating that the first analog signal has been received to the secondary winding of the transformer;
a second analog to digital converter circuit connected on the secondary side of the data acquisition circuit and arranged to receive a second analog signal and output a second data signal indicating that the second analog signal has been received to the secondary winding of the transformer; and
a data demodulator circuit connected on the primary side of the data acquisition circuit and comprising a demodulator resistor, the data demodulator circuit constructed and arranged to
receive a pull modulation signal from the primary winding of the transformer when the pull switch is closed, the pull modulation signal substantially comprising the first data signal;
receive a push modulation signal from the primary winding of the transformer when the push switch is closed, the push modulation signal substantially comprising the second data signal;
compare a voltage associated with the push modulation signal to a threshold voltage and output a result of the push modulation comparison to the control and data decode logic element, wherein the voltage associated with the push modulation signal is a voltage across the demodulator resistor; and compare a voltage associated with the pull modulation signal to the threshold voltage and output a result of the pull modulation comparison to the control and data decode logic element, wherein the voltage associated with the pull modulation signal is a voltage across the demodulator resistor;

wherein the threshold voltage has a value between a voltage across a static load of the secondary side of the data acquisition circuit and a voltage across a static load of the secondary side of the data acquisition circuit plus the pull modulator resistor or the push modulator resistor.

23. The data acquisition circuit of claim 22, further comprising a power supply on the secondary side of the data acquisition circuit constructed and arranged to send a direct current power signal to the first analog to digital converter circuit and the second analog to digital converter circuit.

24. The data acquisition circuit of claim 22, further comprising a voltage source on the primary side of the data acquisition circuit constructed and arranged to supply an alternating current signal to the primary winding of the transformer.

25. The data acquisition circuit of claim 22, wherein the push switch comprises a field effect transistor (FET) and the pull switch comprises a FET.

26. The data acquisition circuit of claim 22, wherein:
the first analog to digital converter circuit comprises
    a first analog to digital converter on the secondary side of the data acquisition circuit constructed and arranged to receive the first analog signal and output a first digital signal indicating that the first analog signal has been received; and
    a first data modulator circuit on the secondary side of the data acquisition circuit constructed and arranged to receive the first digital signal from the first analog to digital converter and close a pull modulator switch in response to output the first data signal to the secondary winding of the transformer; and
the second analog to digital converter circuit comprises
    a second analog to digital converter on the secondary side of the data acquisition circuit constructed and arranged to receive the second analog signal and output a second digital signal indicating that the second analog signal has been received; and
    a second data modulator circuit on the secondary side of the data acquisition circuit constructed and arranged to receive the second digital signal from the second analog to digital converter and close a push modulator switch in response to output the second data signal to the secondary winding of the transformer.

27. The data acquisition circuit of claim 26, wherein:
the first data modulator circuit comprises
    a pull modulator diode in communication with the secondary winding of the transformer;
    a pull modulator resistor in communication with the pull modulator diode;
    the pull modulator switch, wherein the pull modulator switch is in communication with the pull modulator resistor and the first analog to digital converter; and
the second data modulator circuit comprises
    a push modulator diode in communication with the secondary winding of the transformer;
    a push modulator resistor in communication with the push modulator diode; and
    the push modulator switch, wherein the push modulator switch is in communication with the push modulator resistor and the second analog to digital converter.

28. The data acquisition circuit of claim 22, further comprising a chip select recovery circuit on the secondary side of the data acquisition circuit constructed and arranged to:
    receive a data decode signal from the secondary winding of the transformer, the data decode signal substantially comprising the control signal;
    extract a chip select signal from the data decode signal; and
    send the chip select signal to the first analog to digital converter and the second analog to digital converter;
    wherein the first analog to digital converter and the second analog to digital converter are constructed and arranged to be triggered to perform analog to digital conversion based on data in the chip select signal.

29. The data acquisition circuit of claim 28, wherein the chip select recovery circuit comprises:
    a first diode comprising an input connected to a first node of the secondary winding of the transformer and an output;
    a second diode comprising an input connected to a second node of the secondary winding of the transformer and an output;
    a capacitor connected to the output of the first diode and the output of the second diode;
    a load connected to the output of the first diode and the output of the second diode; and
    an inverter circuit connected to the output of the first diode, the output of the second diode, and the capacitor, the inverter circuit being constructed and arranged to generate the chip select signal based on a combined signal received from the output of the first diode, the output of the second diode, and the capacitor.

30. The data acquisition circuit of claim 22, further comprising a clock recovery circuit on the secondary side of the data acquisition circuit constructed and arranged to:
    receive a data decode signal from the secondary winding of the transformer, the data decode signal substantially comprising at least a portion of the control signal;
    extract a clock signal from the data decode signal; and
    send the clock signal to the first analog to digital converter and the second analog to digital converter.

31. The data acquisition circuit of claim 30, wherein the clock recovery circuit comprises:
    a diode comprising an input connected to the secondary winding of the transformer and an output;
    a load connected to the output of the diode; and
    an inverter circuit connected to the output of the diode, the inverter circuit being constructed and arranged to generate the clock signal based on a signal received from the output of the diode.

32. The data acquisition circuit of claim 22, wherein the control and data decode logic element is further constructed and arranged to:
    perform serial to parallel data processing on the result of the push modulation comparison to generate processed push data;
    store the processed push data in a data register;
    perform serial to parallel data processing on the result of the pull modulation comparison to generate processed pull data; and
    store the processed pull data in a data register.

33. The data acquisition circuit of claim 22, further comprising:
    a first analog processing circuit constructed and arranged to receive an input from a first sensor and generate the first analog signal, wherein the first analog signal comprises data associated with the input from the first sensor; and a second analog processing circuit constructed and arranged to receive an input from a second sensor and generate the second analog signal, wherein the second analog signal comprises data associated with the input from the second sensor.

\* \* \* \* \*